United States Patent
Bush et al.

(10) Patent No.: US 10,912,101 B2
(45) Date of Patent: Feb. 2, 2021

(54) FREQUENCY-BASED COMMUNICATION SYSTEM AND METHOD

(71) Applicant: General Electric Company, Schenectady, NY (US)

(72) Inventors: Stephen Francis Bush, Niskayuna, NY (US); Guillaume Mantelet, Oakbank (CA)

(73) Assignee: General Electric Company, Schenectady, NY (US)

( * ) Notice: Subject to any disclaimer, the term of this patent is extended or adjusted under 35 U.S.C. 154(b) by 7 days.

(21) Appl. No.: 16/281,406

(22) Filed: Feb. 21, 2019

(65) Prior Publication Data

US 2020/0154452 A1    May 14, 2020

Related U.S. Application Data

(60) Provisional application No. 62/758,791, filed on Nov. 12, 2018.

(51) Int. Cl.
*H04W 72/12*        (2009.01)
*H04W 72/04*        (2009.01)

(52) U.S. Cl.
CPC ......... *H04W 72/12* (2013.01); *H04W 72/044* (2013.01)

(58) Field of Classification Search
None
See application file for complete search history.

(56) References Cited

U.S. PATENT DOCUMENTS

| | | | |
|---|---|---|---|
| 4,627,099 A | 12/1986 | Shimakata | |
| 6,301,262 B1 | 10/2001 | Peterson | |
| 10,511,403 B2 * | 12/2019 | Bush | H04J 3/0697 |
| 2007/0210897 A1 | 9/2007 | Wong et al. | |
| 2009/0092139 A1 | 4/2009 | Coley | |
| 2009/0106848 A1 | 4/2009 | Coley | |
| 2010/0135238 A1 | 6/2010 | Sadri et al. | |
| 2014/0314002 A1 | 10/2014 | Hanson et al. | |
| 2016/0081073 A1 * | 3/2016 | Lindoff | H04W 72/048 370/329 |
| 2016/0373285 A1 | 12/2016 | Hanson et al. | |
| 2017/0222785 A1 | 8/2017 | Li et al. | |
| 2018/0006955 A1 * | 1/2018 | Bush | H04L 47/22 |

(Continued)

*Primary Examiner* — Phuongchau Ba Nguyen
(74) *Attorney, Agent, or Firm* — Buckley, Maschoff & Talwalker LLC (57) ABSTRACT

A communication system includes multiple nodes of a time-sensitive network and a scheduler device. At least one of the nodes is configured to obtain a first signal that is represented in a frequency domain by multiple frequency components. The scheduler device generates a schedule for transmission of signals including the first signal within the time-sensitive network. The schedule defines multiple slots assigned to different discrete frequency sub-bands within a frequency band. The slots have designated transmission intervals. The nodes are configured to transmit the first signal through the time-sensitive network to a listening device such that the first signal is received at the listening device within a designated time window according to the schedule. At least some of the frequency components of the first signal are transmitted through the time-sensitive network within different slots of the schedule based on the frequency sub-bands assigned to the slots.

18 Claims, 4 Drawing Sheets

(56) References Cited

U.S. PATENT DOCUMENTS

2018/0090988 A1\* 3/2018 MacCleery ........ G05B 19/0423
2018/0309655 A1\* 10/2018 Joseph .................. H04J 3/0667
2019/0123847 A1\* 4/2019 Bush .................... H04L 9/0852

\* cited by examiner

FREQUENCY-BASED COMMUNICATION SYSTEM AND METHOD

CROSS-REFERENCE TO RELATED APPLICATIONS

This application claims priority to U.S. Provisional Application No. 62/758,791, which was filed on 12 Nov. 2018, and the entire disclosure of which is incorporated herein by reference.

FIELD

The subject matter described herein relates to communication networks.

BACKGROUND

The IEEE 802.1 Time-Sensitive Networking Task Group has created a series of standards that describe how to implement deterministic, scheduled Ethernet frame delivery within an Ethernet network. Time-sensitive networking benefits from advances in time precision and stability to create efficient, deterministic traffic flows in an Ethernet network. Time-sensitive networks can be used in safety critical environments, such as control systems for automated industrial systems. In these environments, timely and fast control of vehicles and/or machinery is needed to ensure that operators and equipment at or near the vehicles and/or machinery being controlled are not hurt or damaged.

Some known time-sensitive networks are scheduled in the time domain utilizing frame sizes and traffic flow latencies as scheduling constraints. But, limiting the acceptable range of frame sizes and traffic flow latencies may add complexity and/or unnecessarily constrain the potential solutions of the scheduling device, especially when the time-sensitive network communicates messages represented by frequency-based acoustic signals. Furthermore, known time-sensitive networks are not scheduled based on the quality or fidelity of signals transmitted through the time-sensitive network, and therefore the signals exiting the time-sensitive network may fail to satisfy quality standards.

BRIEF DESCRIPTION

In one or more embodiments, a communication system is provided that includes multiple nodes of a time-sensitive network and a scheduler device. The time-sensitive network optionally can be disposed onboard one or more vehicles, but alternatively may not be disposed onboard any vehicles. The nodes are communicatively connected to each other via links. At least one of the nodes is configured to obtain a first signal from a publishing device. The first signal is represented in a frequency domain by multiple frequency components. The scheduler device comprises one or more processors and is configured to generate a schedule for transmission of signals including the first signal within the time-sensitive network. The schedule defines multiple slots assigned to different discrete frequency sub-bands within a frequency band. These slots have designated transmission intervals. The nodes communicate (e.g., transmit) the first signal through the time-sensitive network to a listening device such that the first signal is received at the listening device within a designated time window according to the schedule. At least some of the frequency components of the first signal are transmitted through the time-sensitive network within different slots of the schedule based on the frequency sub-bands assigned to the slots.

In one or more embodiments, a method for communications is provided that includes generating a schedule for transmission of signals within a time-sensitive network. The schedule defines multiple slots assigned to different discrete frequency sub-bands within a frequency band. The slots have designated transmission intervals. The method includes obtaining a first signal of the signals from a publishing device. The first signal is represented in a frequency domain by multiple frequency components. The method also includes transmitting the first signal through the time-sensitive network to a listening device such that the first signal is received at the listening device within a designated time window according to the schedule. At least some of the frequency components of the first signal are transmitted through the time-sensitive network within different slots of the schedule based on the frequency sub-bands assigned to the slots.

BRIEF DESCRIPTION OF THE DRAWINGS

The present inventive subject matter will be better understood from reading the following description of non-limiting embodiments, with reference to the attached drawings, wherein below.

DETAILED DESCRIPTION

One or more embodiments of the inventive subject matter described herein relate to systems and methods that schedule the transmission of signals in a time-sensitive network in the frequency domain to improve the transmission of acoustic signals. For example, the time-sensitive network is scheduled to transmit acoustic signals that have a frequency content, such as but not limited to audio compressed signals, ultrasound, vibrations, acoustic phenomena, or the like. In one or more embodiments, a control device of the time-sensitive network, such as a scheduler device, is configured to account for signal fidelity of the signals when scheduling the time-sensitive network. For example, the scheduler may schedule the time-sensitive network based on one or more signal fidelity targets, instead of (or in addition to) frame size and traffic flow latency constraints. The signal fidelity target may be a metric that indicates a general quality of the signal that is output from the time-sensitive network. More specifically, the signal fidelity target can represent a degree of correspondence between a state or quality of a given signal exiting the time-sensitive network and the state or quality of the same signal entering the time-sensitive network.

At least one technical effect of the subject matter described herein provides for reduced complexity in the scheduling of time-sensitive networks by scheduling in the frequency domain based on frequency components of acoustic signals instead of scheduling in the time domain. Another technical effect of scheduling in the frequency domain is improved signal fidelity because the time-sensitive network functions as a low pass filter. For example, by scheduling the transmission of signals along different specific frequency sub-bands in a bandwidth, signal components having frequencies outside of the scheduled frequency sub-bands may be filtered out (e.g., not transmitted). The frequencies that are filtered out may be attributable to background noise, interference, minor components of the signals, and/or the like. The filtering of signal components may reduce the complexity and amount of information transmitted over the time-sensitive network versus transmitting all components of the received signals, which may improve the reliability and throughput of the network. Another technical effect of scheduling in the frequency domain based on the signal fidelity target, instead of frame size and/or latency periods, is an increase in the number of potential solutions that may be analyzed by the scheduler device when or while generating the schedule. For example, by scheduling in the frequency domain, it may be permissible for signals that are communicated through the time-sensitive network to have periodic latencies at nodes that would otherwise violate a latency constraint.

Figure 1:
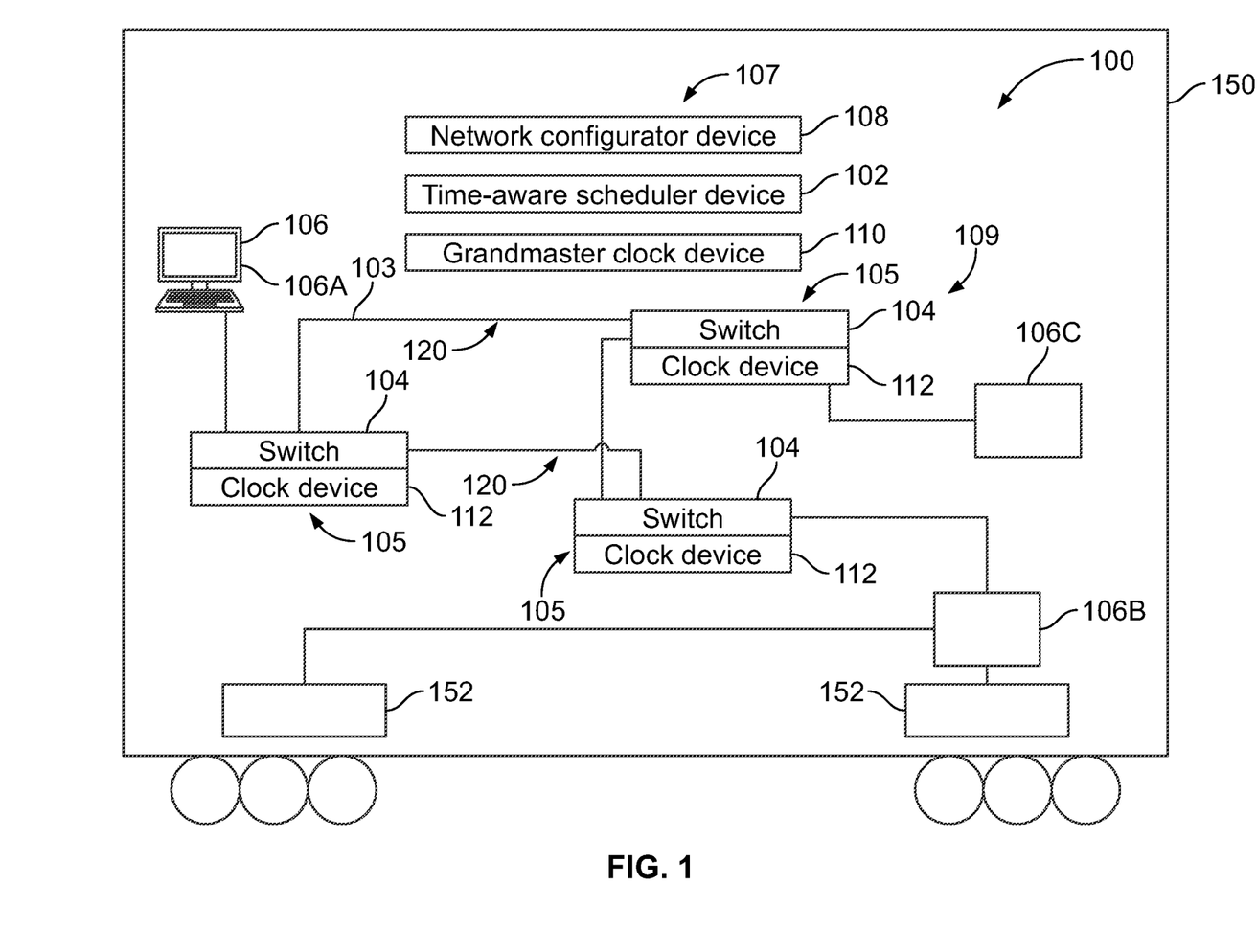
FIG. 1 schematically illustrates one embodiment of a communication system that includes a control system and a time-sensitive network.

FIG. 1 schematically illustrates one embodiment of a communication system 100 that includes a control system 107 and a time-sensitive network 109. The control system 107 controls communications through the time-sensitive network 109. The components shown in FIG. 1 represent hardware circuitry that includes and/or is connected with one or more processors (e.g., one or more microprocessors, field programmable gate arrays, and/or integrated circuits) that operate to perform the functions described herein. The components of the communication system 100 can be communicatively coupled with each other by one or more wired and/or wireless connections. Not all connections between the components of the communication system 100 are shown herein. The time-sensitive network 109 can be configured to operate according to one or more of the time-sensitive network standards of IEEE, such as the IEEE 802.1ASTM-2011 Standard, the IEEE 802.1Q™-2014 Standard, the IEEE 802.1Qbu™-2016 Standard, and/or the IEEE 802.3br™-2016 Standard.

The time-sensitive network 109 includes several node devices 105 (hereafter referred to as nodes) formed of network switches 104 and/or associated clocks 112 ("clock devices" in FIG. 1). While only three nodes 105 are shown in FIG. 1, the communication system 100 can be formed of many more nodes 105 that may be distributed over a large geographic area. The switches 104 of the nodes 105 may include or represent electrical switches, routers, bridges, hubs, and/or the like. The nodes 105 are communicatively connected to one another via communication links 103 (referred to herein as links 103). The links 103 may include or represent physical communication pathways, such as copper wires and/or cables, optical wires and/or cables, Ethernet links, and the like. Optionally, the links 103 may represent wireless communication pathways.

The time-sensitive network 109 can be an Ethernet network that communicates data frames (or packets) as signals along traffic flow paths 120 between communicating devices 106. A signal referred to herein can be a message formed of many data packets or frames, several data packets or frames making us less than an entire message, or an individual data packet or frame. The traffic flow paths 120 can be defined by the nodes 105 and the links 103 that are in the different paths 120. For example, a data frame may be transmitted through a path 120 from a first link 103 to a second link 103 through a node 105 that connects the first and second links 103, with the path 120 formed of the first and second links 103 and the node 105. The data frames can be sent along different paths 120 according to a schedule of the time-sensitive network 109. The paths 120 may partially overlap or intersect each other. For example, two paths 120 may partially overlap when the paths 120 share at least one of the same links 103. Two paths 120 may intersect each other when the paths 120 share at least one of the same nodes 105. The schedule restricts which data frames can be communicated by each of the nodes 105 along one or more (or all) paths 120 at different times.

Different data frames (e.g., signals) can be communicated at different repeating scheduled time periods based on traffic classifications of the frames. Some data frames represent messages that are classified as time-critical traffic (referred to herein as time-critical messages) while other data frames represent messages classified as best-effort traffic (referred to herein as best-effort messages). The time-critical messages have a higher priority than the best effort messages. The time-critical messages may be required to be communicated at or within designated periods of time to ensure the safe operation of a powered system, such as industrial machinery or a vehicle (e.g., locomotive, automobile, off-road truck, marine vessel, aircraft, or the like). If a time-critical message is not received within the designated time period or window, the lack of timely receipt of the time-critical message may risk harm to people and/or damage to the system or surroundings. The best-effort messages include data frames that are not required to ensure the safe operation of the powered system, but that are communicated for other purposes (e.g., monitoring operation of components of the powered system).

The communicating devices 106 that communicate via the time-sensitive network 109 may be computers, sensors, servers, control devices, or the like. In one embodiment, the devices 106 are disposed onboard one or more vehicles. For example, a first vehicle device 106A of the devices 106 may be a different type of device from a second vehicle device 106B and/or a third vehicle device 106C. The device 106 that generates or inputs a message (defined by one or more signals) into the time-sensitive network 109 for communication to another device 106 is referred to as a publishing device (or publisher). The device 106 that receives the message output from the time-sensitive network 109 is referred to as a listening device (or listener). For example, a first vehicle device 106A may be the publishing device and a second vehicle device 106B may be the listening device for a given message transmitted via the time-sensitive network 109. Optionally, one or more of the devices 106 may be able to function as both publishing devices and listening devices to enable bi-directional communications between the devices 106 through the time-sensitive network 109. Although three devices 106A-C are shown in FIG. 1, the communication system 100 may enable more than three devices 106 (e.g., dozens, hundreds, or thousands), or only two devices 106, to reliably communicate with one another.

The control system 107 includes a time-aware scheduler device 102, a centralized network configurator device 108, and a grandmaster clock device 110. The scheduler device 102 generates a schedule that instructs each node 105 to transmit an Ethernet data frame along a predefined path 120 at a prescheduled time, creating deterministic traffic flows while sharing the same media with legacy, best-effort Ethernet traffic. The time-sensitive network 109 has been developed to support hard, real-time applications where delivery of frames of time-critical traffic must meet tight schedules without causing failure, particularly in life-critical vehicular and/or industrial control systems. The scheduler device 102 computes the schedule, and the schedule is installed at each node 105 in the time-sensitive network 109 or some, but not all, nodes 105. This schedule dictates when different types or classification of signals are communicated by the switches 104 of the nodes 105. For example, the schedule may dictate that a given switch 104 transmits a time-critical message at a first time or interval, and the switch 104 transmits a best effort message at a different, second time or interval. The schedule may also dictate arrival time windows or periods within which the data frames are required to be received at a designated listening device, such as the vehicle device 106B.

The scheduler device 102 may solve a system of scheduling equations to create the schedule for the switches 104 of the nodes 105 to send Ethernet frames in a time-sensitive manner through the communication system 100. This schedule may be subject to various constraints, such as the topology of the time-sensitive network 109, the speed of communication by and/or between switches 104 in the time-sensitive network 109, the amount of Ethernet frames to be communicated through different switches 104, etc. This schedule can be created to avoid two or more Ethernet frames colliding with each other at a switch 104 (e.g., to prevent multiple frames from being communicated through the same switch 104 at the same time).

The scheduler device 102 may be formed from hardware circuitry that is connected with and/or includes one or more processors that generate the schedule for the time-sensitive network 109. The scheduler device 102 is synchronized with the grandmaster clock device 110 of the control system 107. The grandmaster clock device 110 includes a clock to which the clocks 112 of the nodes 105 are synchronized.

The centralized network configurator device 108 (referred to herein as configurator device 108) of the control system 107 is comprised of software and/or hardware that has knowledge of the physical topology of the time-sensitive network 109 as well as the traffic flow paths 120. The configurator device 108 can be formed from hardware circuitry that is connected with and/or includes one or more processors that determine or otherwise obtain the topology information from the nodes 105 and/or user input.

The physical topology of the time-sensitive network 109 maps the hardware of the time-sensitive network 109, including the locations (e.g., absolute and/or relative locations) of all of the nodes 105, the vehicle devices 106, and the links 103 that connect the nodes 105 and the vehicle devices 106. The topology can also identify which of the nodes 105 are directly coupled with other nodes 105 and/or the vehicle devices 106 via links 103. The locations of the hardware components can be used to determine distances between the hardware components, which may be utilized by the scheduler device 102 when scheduling flow paths 120 for conveying data frames within designated time windows. The physical topology may also include additional information about the hardware within the time-sensitive network 109, such as the types of hardware (e.g., part numbers), instructions for communicating with the various nodes 105 and other hardware, and/or the like.

The topology information may be stored in a database and accessed by the configurator device 108. Alternatively, the configurator device 108 may generate the topology information by communicating with the nodes 105 in the time-sensitive network 109 to determine the types and locations (relative or absolute) of the nodes 105. The configurator device 108 can provide this topology information to the scheduler device 102, which uses the topology information to determine the schedules for communication of messages between the vehicle devices 106. The configurator device 108 and/or scheduler device 102 can communicate the schedule to the different nodes 105.

The hardware circuitry and/or processors of the configurator device 108 can be at least partially shared with the hardware circuitry and/or processors of the scheduler device 102. For example, one or more processors and associated circuitry may be configured to perform the operations of both the configurator device 108 and the scheduler device 102 as described herein. Alternatively, the one or more processors of the configurator device 108 are all discrete and separate from the one or more processors of the scheduler device 102. In yet another embodiment, a subset of processors of the configurator device 108 is shared in common with the scheduler device 102, and/or a subset of processors of the scheduler device 102 is shared in common with the configurator device 108.

The control system 107 (e.g., the scheduler device 102) may communicate with the time-aware nodes 105 (e.g., the switches 104 with respective clocks 112) through a network management protocol. For example, a link layer discovery protocol can be used to exchange information between the nodes 105 and the scheduler device 102. The time-aware nodes 105 may implement a control plane element that forwards the commands from the scheduler device 102 to their respective hardware. The configurator device 108 may poll the nodes 105 and the vehicle devices 106 to retrieve topology information of the time-sensitive network 109 via the network management protocol, and the topology information may be provided to the scheduler device 102.

In one or more embodiments, the communication system 100 is disposed on one or more vehicles of a vehicle system. Alternatively, the communication system 100 may not be disposed onboard any vehicle. In FIG. 1, the communication system 100 is disposed on a locomotive 150 (e.g., a propulsion-generating rail vehicle) of a rail vehicle system. The locomotive 150 may be mechanically and communicatively coupled to another locomotive or a non-propulsion generating rail car. For example, the locomotive 150 may be communicatively coupled to another locomotive by a wired connection, such as a 27-pin trainline cable. The components of the communication system 100, such as the nodes 105, the configurator device 108, the scheduler device 102, and the vehicle devices 106, may be entirely disposed onboard the locomotive or the rail vehicle system, such that all components are disposed onboard the same vehicle or onboard multiple vehicles that travel together along routes as a vehicle system. Alternatively, at least some of the components of the communication system 100, such as the configurator device 108 and/or the scheduler device 102, may be disposed off-board the rail vehicle system.

While the communication system 100 is shown as being disposed onboard a locomotive 150 of a rail vehicle system, alternatively, the communication system 100 may be disposed onboard another type of vehicle such as an automobile, a marine vessel, a mining vehicle, or another off-highway vehicle (e.g., a vehicle that is not legally permitted or that is not designed for travel along public roadways). In yet another embodiment, the communication system 100 may be installed off-board a vehicle, such as installed in an industrial setting (e.g., factory, manufacturing plant, or the like). For example, the communication system 100 optionally may be used to provide network communications in systems other than vehicle networks.

The vehicle devices 106 may provide data and/or control signals that are important for the safe operation of the rail vehicle system. The vehicle devices 106 may represent one or more of traction motor controllers, an engine control unit, an auxiliary load controller, an input/output device, sensors, and/or the like. The time-sensitive network 109 is utilized to ensure precise, uninterrupted communication between these devices to ensure safe operation of the locomotive 150. For example, the communications between these devices that are used for controlling the movement of the locomotive 150 may be designated as time-critical messages that have a greater priority than best effort messages between different, less critical vehicle devices.

In FIG. 1, the first vehicle device 106A may be an input/output device. The input/output device 106A may represent one or more devices that receive input from an operator onboard the locomotive 150 and/or that present information to the operator. The input/output device 106A can represent one or more touchscreens, keyboards, styluses, display screens, lights, speakers, or the like.

The second vehicle device 106B may be a traction motor controller that controls operation of traction motors 152 of the locomotive 150. The traction motor controller 106B represents hardware circuitry that includes and/or is connected with one or more processors (for example, one or more microprocessors, field programmable gate arrays, and/or integrated circuits) that generate control signals for controlling the traction motors 152. For example, based on or responsive to a throttle setting selected by an operator input via the input/output device 106A and communicated to the traction motor controller 106B via the time-sensitive network 109, the traction motor controller 106B may change a speed at which one or more of the traction motors 152 operate to implement the selected throttle setting.

The third vehicle device 106C may be an engine control unit, an auxiliary load controller, a sensor, or the like. For example, each of the engine control unit and the auxiliary load controller represents hardware circuitry that includes and/or is connected with one or more processors (for example, one or more microprocessors, field programmable gate arrays, and/or integrated circuits) that generate control signals. The control signals generated by the engine control unit are communicated to an engine of the locomotive 150 (for example, based on input provided by the input/output device 106A) in order to control operation of the engine of the locomotive 150. The control signals generated by the auxiliary load controller are communicated to one or more auxiliary loads of the locomotive 150 to control operation of the one or more auxiliary loads. The auxiliary loads may consume electric current without propelling movement of the locomotive 150. The auxiliary loads can include, for example, fans or blowers, battery chargers, lights, and/or the like. The third vehicle device 106C is referred to as the engine control unit 106C herein.

To ensure that communications between the vehicle devices 106 (e.g., input/output devices, traction motor controllers, engine control units, auxiliary load controllers, sensors, and/or the like) are sent and/or received in time, the scheduler device 102 schedules the communications through the time-sensitive network 109. Communicating through the time-sensitive network 109 ensures, for example, that a change to a throttle setting received by the input/output device is received by the traction motor controllers within a designated period of time, such as within a few milliseconds. In contrast to a conventional Ethernet network (operating without a time-sensitive network) that communicates data frames or packets in a random manner, the time-sensitive network 109 communicates the data frames or packets according to the type or category of the data or information being communicated to ensure that the data is communicated within designated time periods or at designated times. With respect to some vehicle control systems, the late arrival of data can have significantly negative consequences, such as an inability to slow or stop movement of a vehicle in time to avoid a collision.

As described above, the time-sensitive network 109 may be an Ethernet network that prioritizes communications and dictates when certain communications occur to ensure that certain data frames or packets are communicated within designated time periods or at designated times. The communications between or among some of the vehicle devices 106 may include time sensitive information or data. For example, data indicative of a change in a brake setting may need to be communicated from the input/output device 106A to the traction motor controller 106B within several milliseconds of being sent by the input/output device 106A into the network 109. The failure to complete this communication within the designated time limit or period of time may prevent the rail vehicle system from braking in time. Non-time sensitive communications may be communications that do not necessarily need to be communicated within a designated period of time, such as communication of a location of the vehicle system from a global positioning system (GPS) receiver, a measurement of the amount of fuel from a fuel sensor, etc. These non-time sensitive communications may be designated as best effort communications that are a lower priority than the time sensitive communications.

Best effort communications may be communicated within the time-sensitive network 109 when there is sufficient bandwidth in the network 109 to allow for the communications to be successfully completed without decreasing the available bandwidth in the network 109 below a bandwidth threshold needed for the communication of time sensitive communications between publishing devices and listening devices. For example, if 70% of the available bandwidth in the network 109 is needed at a particular time to ensure that communications with the engine control unit 106C and traction motor controller 106B successfully occur, then the remaining 30% of the available bandwidth in the network 109 may be used for other communications, such as best effort communications with the auxiliary load controller. The bandwidth threshold may be a user-selected or default amount of bandwidth. The communication of best effort communications may be delayed to ensure that the time sensitive communications are not delayed.

The priority statuses of different types of communications may be set by the control system 107 and/or the operator of the locomotive 150. For example, the control system 107 may designate that all communications to and/or from the engine control unit 106C, the traction motor controller 106B, the input/output device 106A, and sensors that monitor engine conditions, traction motor conditions, and brake conditions are time sensitive communications, and communications to and/or from onboard display devices, the auxiliary load controller, and auxiliary devices are best effort communications. Optionally, the type of information being communicated by these devices may determine the type of communications. For example, the control system 107 may establish that control signals (e.g., signals that change operation of a device, such as by increasing or decreasing a throttle of a vehicle, applying brakes of a vehicle, etc.) communicated to the engine control unit 106C and/or traction motor controller 106B may be time sensitive communications while status signals (e.g., signals that indicate a current state of a device, such as a location of the locomotive 150) communicated from the engine control unit 106C and/or traction motor controller 106B are best effort communications.

According to one or more embodiments described herein, the time-sensitive network 109 is configured to communicate acoustic signals between the vehicle devices 106 in addition to, or as an alternative to, conventional electrical signals. The acoustic signals may each be represented by multiple frequency components, such as components at different frequencies within a frequency band or spectrum. The acoustic signals may include audio signals, audible sound signals, ultrasound signals, infrasound or low frequency signals, vibrations, and/or the like. An audio signal may represent a signal in an audio and/or video application. Audible sounds are in the frequency range perceptible to an ordinary person. The frequencies of the ultrasound signals and the infrasound signals are greater and less than, respectively, frequencies perceptible to the ordinary person. The vibration signals may refer to the vibrations of various components onboard the locomotive 150, such as the engine.

Figure 2:
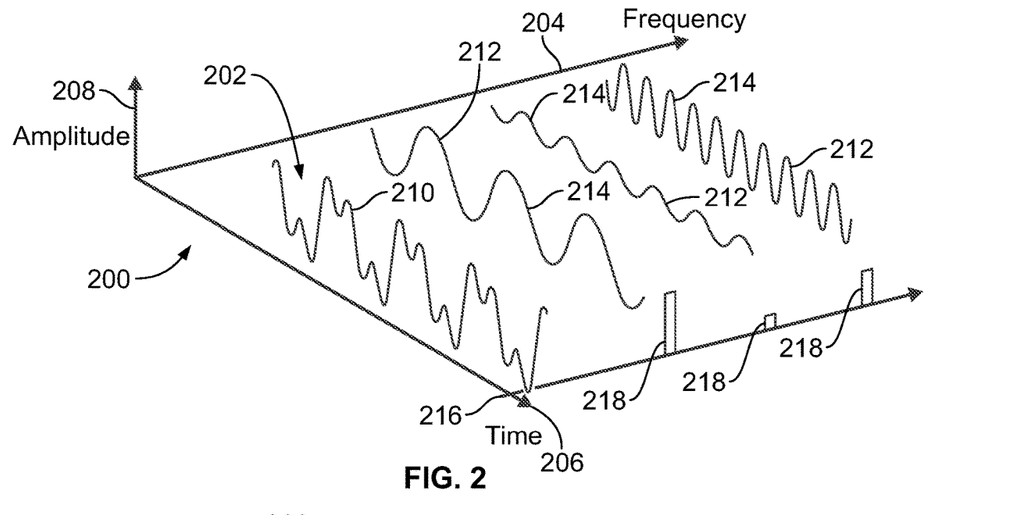
FIG. 2 is a graph plotting an acoustic signal in both a frequency domain and a time domain according to an embodiment.

FIG. 2 is a graph 200 plotting an acoustic signal 202 in both a frequency domain and a time domain according to an embodiment. The graph 200 has a frequency axis 204, a time axis 206, and an amplitude axis 208. The acoustic signal 202 can be represented in the time domain as a single waveform 210 that has multiple different amplitude peaks and multiple different amplitude valleys over time. The acoustic signal 202 can also be represented in the frequency domain as multiple frequency components 212. The acoustic signal 202 in the frequency domain shows how much of the signal 202 lies within different frequency bands. The frequency components 212 have different frequencies, and therefore are spaced apart along the frequency axis 204 within different frequency bands. The acoustic signal 202 has three frequency components 212 in the illustrated embodiment, but other acoustic signals may have only two or at least four frequency components. When viewed in the time domain, each of the frequency components 212 is a sine wave 214 with a corresponding amplitude and period (e.g., frequency). In the frequency domain, the frequency components 212 can be represented by bars 218. For example, at a specific time 216, the three frequency components 212 have different frequencies (as represented by spaced apart locations of bars 218 along the frequency axis 204) and different amplitudes (as represented by the different heights of the bars 218).

The acoustic signal 202 is a combination of the frequency components 212. Each of the frequency components 212 may be defined by a frequency, an amplitude, and/or a phase (e.g., phase shift). Different frequency components 212 may have different frequencies, amplitudes, and/or phases. The frequency components 212 may be represented as complex numbers including an amplitude (e.g., magnitude) of the component 212 and relative phase of the wave (e.g., angle) at a given frequency.

On the locomotive 150, the acoustic signal 202 or other acoustic signals may represent a signature vibration of the engine that is monitored and/or measured by a sensor. The acoustic signal 202 or other acoustic signals may represent a phase and/or frequency of electrical current conveyed to or from the traction motors 152 (shown in FIG. 1). The acoustic signal 202 or other acoustic signals may represent a voice command input by an operator utilizing a microphone of the input/output device 106A (shown in FIG. 1). The acoustic signal 202 or other acoustic signals may represent audio and/or video content captured by a sensor and/or camera onboard the locomotive 150.

Figure 3:
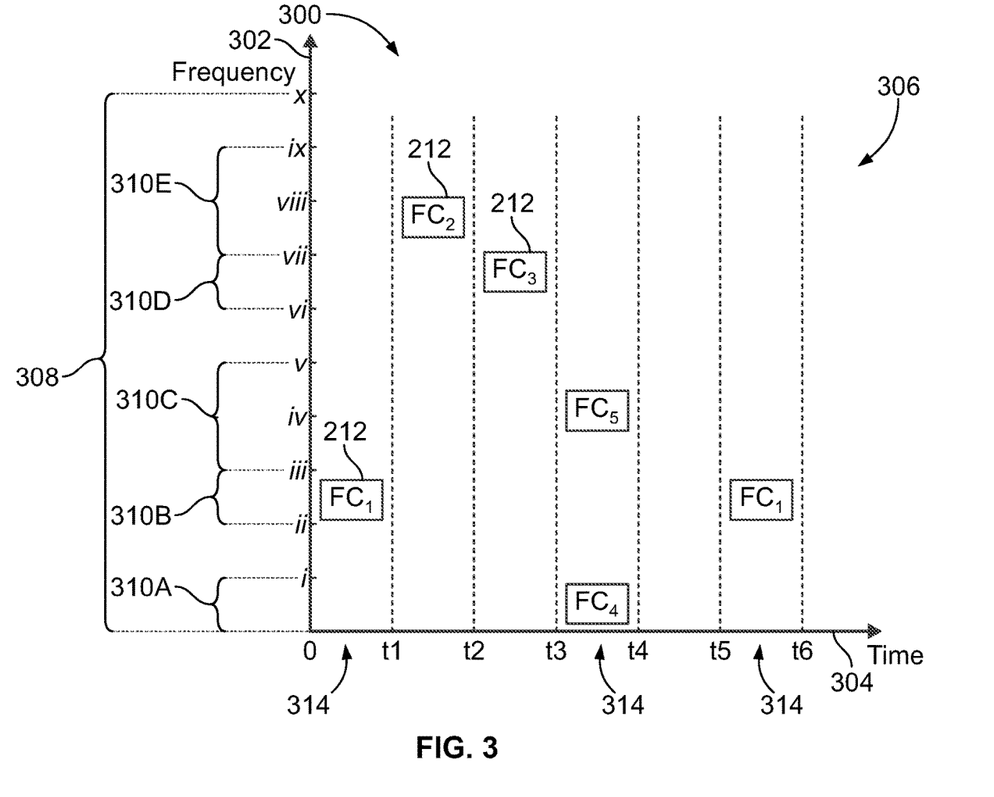
FIG. 3 is a graph illustrating a portion of a schedule for the time-sensitive network according to an embodiment.

FIG. 3 is a graph 300 illustrating a portion of a schedule 306 for the time-sensitive network 109 according to an embodiment. The graph 300 has a vertical axis 302 that represents a frequency band 308 or spectrum. The graph 300 also has a horizontal axis 304 representing time. The schedule 306 may be generated by the scheduler device 102 (shown in FIG. 1). In an embodiment, the scheduler device 102 generates the schedule 306 in the frequency domain. The schedule 306 dictates that different frequency components 212 of one or more signals (e.g., the signal 202 shown in FIG. 2) are transmitted through the time-sensitive network 109 at different time intervals. FIG. 3 shows five frequency components 212, identified as $FC_1$, $FC_2$, $FC_3$, $FC_4$, and $FC_5$. All five frequency components 212 optionally may be components of the same acoustic signal. Alternatively, the five frequency components 212 may represent at least two different acoustic signals.

In an embodiment, the schedule 306 defines multiple slots 310 that are assigned to different frequency sub-bands within the frequency band 308. The frequency sub-bands are discrete from each other, such that the slots 310 do not have overlapping sub-bands. The schedule 306 defines five slots 310 in FIG. 3, which are identified as 310A, 310B, 310C, 310D, 310E, but the schedule 306 may have any number of slots 310. For example, the slot 310B is assigned to a frequency sub-band between frequencies ii and iii in FIG. 3, which is a frequency range. In a non-limiting example, the frequency ii may represent 50 Hz and the frequency iii represents 100 Hz, such that the slot 310B is assigned to the frequency sub-band from 50 Hz to 100 Hz. The scheduler device 102 may assign the frequency sub-bands to the different slots 310 during the scheduling process. Optionally, at least some of the frequency sub-bands assigned to the slots 310 may have different widths (e.g., different sizes or ranges between the corresponding two outer frequencies). For example, the slots 310C and 310E are assigned to respective sub-bands that have greater widths than the respective sub-bands assigned to slots 310A, 310B, and 310D. Alternatively, all of the slots 310 may be assigned to frequency sub-bands having the same widths although spaced apart along the frequency band 308.

The schedule 306 designates that the different slots 310 have different transmission intervals 314. The transmission intervals 314 represent designated times or time windows at which a particular signal or data frame is transmitted by the nodes 105 (shown in FIG. 1) of the time-sensitive network 109. For example, in the schedule 306 shown in FIG. 3, the slot 310A has a transmission interval 314 between times $t_3$ and $t_4$. Therefore, a node 105 may gate (e.g., not transmit) a signal or data frame that is within the slot 310A until after time $t_3$, at which the node 105 transmits the signal or data frame to a subsequent node 105 or to a listening device along the path 120 according to the schedule. The node 105 also gates similar signals within the slot 310A after time $t_4$ until the transmission cycle repeats. The slot 310B has a first transmission interval 314 between times 0 and $t_1$ and a second transmission interval 314 between times $t_5$ and $t_6$. Optionally, the transmission intervals 314 may be cyclical. For example, the entire transmission period from time 0 to $t_5$ may repeat such that the transmission interval 314 between times $t_5$ and $t_6$ may be a repeat of the interval 314 between times 0 and $t_1$. The transmission intervals 314 according to the schedule may have the same durations, or at least some of the transmission intervals 314 may have longer durations than other transmission intervals 314.

In at least one embodiment, at least some of the frequency components 212 of the signal 202 (shown in FIG. 2) are transmitted through the time-sensitive network 109 (shown in FIG. 1) within different slots 310 of the schedule 306 based on the frequency sub-bands assigned to the slots 310. The frequency components 212 may be transmitted within slots 310 that are assigned to sub-bands that correspond to the frequencies of the frequency components 212. For example, a frequency component 212 of the signal 202 that has a frequency of 207 Hz may be transmitted within a slot 310 assigned to a frequency sub-band that contains 207 Hz, such as a sub-band from 200 Hz to 250 Hz. In FIG. 3, a first frequency component 212 ("$FC_1$") is transmitted within the slot 310B, such that the first frequency component 212 has a transmission interval 314 between times 0 and $t_1$. A second frequency component 212 ("$FC_2$") of the same signal 202 has a greater frequency than the first frequency component and is transmitted within the slot 310E. For example, the frequency of the second frequency component 212 may be 991 Hz, which is contained within the frequency sub-band 310E. A third frequency component 212 ("$FC_3$") of the same signal 202 has a frequency between the first and second components, and is transmitted within the slot 310D.

The schedule 306 may stagger the transmission intervals 314 of different frequency components 212 such that one frequency component 212 of a signal may be transmitted by the nodes 105 at different times than the nodes 105 transmit another frequency component 212 of the same signal or a different signal. As shown in FIG. 3, the three frequency components 212 ($FC_1$ through $FC_3$) of the same signal 202 are transmitted at different transmission intervals 314. Therefore, these three frequency components 212 may arrive at the designated listening vehicle device 106 at slightly different (e.g., staggered) times. According to at least one embodiment, the different transmission intervals 314 have relatively short durations, such as on the order of microseconds. Due to the short durations, the staggered frequency components 212 are able to be merged and processed at the listening device without a person being able to perceive any offset. For example, if the listening device is a speaker of the input/output device 106A (shown in FIG. 1), the staggered frequency components 212 of the signal 202 can be reconstructed and output by the speaker without a person being able to comprehend any noise or signal degradation caused by a delay between the frequency components 212. The nature of the time-sensitive network 109 ensures that the various frequency components 212 of the signal 202 are received on time within a designated time window according to the schedule. The use of the time-sensitive network 109 to transmit frequency-based signals (such as vibration signals, audio signals, ultrasound signals, and the like) according to a precise schedule may make buffering at the listening device 106 unnecessary.

Optionally, the scheduler device 102 may schedule the time-sensitive network 109 in the frequency domain such that the time-sensitive network 109 functions as a low pass filter. The filter may be used to filter out (e.g., not transmit) certain frequency components of the signals. For example, certain frequencies of the signals may be attributable to background noise, interference, cross-talk, or the like. The signals may also contain frequencies that are unnecessary, such as frequency components of audio signals that are outside of the audible frequency range that can be heard by ordinary persons or frequency components that are masked by other frequencies and are therefore unintelligible. The time-sensitive network 109 can be used to filter out such frequency components that are associated with background, interference, or unnecessary frequencies from the frequency components of the signals that are transmitted through the network 109. This filtering reduces the amount of data transmitted through the time-sensitive network 109, improving the throughput thereof.

For example, the scheduler device 102 may utilize the time-sensitive network 109 as a filter by assigning the frequency sub-bands to the slots 310 such that the assigned sub-bands represent less than an entirety of the frequency band 308. For example, as shown in FIG. 3, the sub-bands between frequencies i and ii, between frequencies v and vi, and between frequencies ix and x are unassigned to the slots 310. Frequency components of the signals that have frequencies contained within the unassigned sub-bands may not be transmitted through the network 109 to the listening device 106. These frequency components are filtered out.

The scheduler device 102 may assign the frequency sub-bands to the slots 310 based on an analysis of one or more signals that would be transmitted through the time-sensitive network 109. For example, the scheduler device 102 may analyze a dynamic range of one or more signals to identify various frequency components of the signals. Based on the analysis, the scheduler device 102 may select certain frequencies that are unnecessary to represent the one or more signals, such as frequencies determined to be attributable to noise or interference and frequencies that are masked or outside of a perceptible range. After selecting the frequencies that are unnecessary to represent the one or more signals, the schedule device 102 generates the schedule 306 such that these frequencies are not assigned to the slots 310.

In an embodiment, the frequency components 212 transmitted through the time-sensitive network 109 may be encoded within Ethernet data frames. For example, the frequency components 212 may be digitally encoded within frames. The Ethernet frames include data that may represent the frequency, amplitude, and/or phase of each frequency component 212 encoded therein. Optionally, the six boxes representing frequency components 212 shown in FIG. 3 may be six different Ethernet data frames transmitted through the network 109. Each data frame may include a single frequency component 212. Alternatively, at least some data frames may encode multiple frequency components 212 in a single frame.

In one or more embodiments, the scheduler device 102 generates the schedule 306 based on a signal fidelity target. The signal fidelity target may be a metric that indicates a general quality of the signal that is output from the time-sensitive network 109. For example, the signal fidelity target may represent a degree of correspondence between a state or quality of a given signal exiting the time-sensitive network 109 and the state or quality of the same signal entering the time-sensitive network 109. The signal fidelity may be determined by comparing the signal at the state provided by the publishing device 106 to the same signal at the state provided by the network 109 to the listening device 106. Filtering out certain frequencies of the signal to improve the throughput of the time-sensitive network 109 may negatively affect the signal fidelity because the outgoing signal differs from the incoming signal by at least the filtered out components. Therefore, there may be a tradeoff associated with filtering out components of the signals. Reduced filtering may improve the signal fidelity of the transmitted signals as the cost of reducing network throughput and increasing the load on the network 109.

The scheduler device 102 may obtain a designated signal fidelity target. The signal fidelity target may be stored in a memory and accessed by the scheduler device 102. For example, the signal fidelity target may be based on a standard or regulation. Alternatively, the signal fidelity target may be selected by an operator using the input/output device 106A (shown in FIG. 1), and the operator selection may be received by the scheduler device 102. Upon obtaining the signal fidelity target, the scheduler device 102 utilizes the signal fidelity target as a constraint and schedules the time-sensitive network 109 to satisfy the signal fidelity target. The scheduler device 102 may base the assignment of the frequency sub-bands to the slots 310 on the signal fidelity target. For example, the scheduler device 102 may assign the slots 310 to a sufficient number and size of frequency sub-bands in the frequency band 308 to satisfy the signal fidelity target. Increasing the number and/or size of sub-bands assigned to the slots 310 may reduce the number of frequency components of the signals that are filtered out by the time-sensitive network 109, thereby increasing the signal fidelity. In an embodiment, the scheduler device 102 assigns the frequency sub-bands to the slots 310 such that the signal fidelity achieved by the network 109 is at or only slightly greater than the designated signal fidelity target. For example, if it is determined that a potential schedule does not satisfy the signal fidelity target, then the potential schedule is modified and/or another potential is generated to increase the signal fidelity of the network 109. The schedule may be modified to increase the signal fidelity by increasing the number of sub-bands assigned to the slots 310 and/or the widths (e.g., sizes) of the sub-bands assigned to the slots 310. As a result, the network 109 is scheduled to satisfy the designated signal fidelity target, but the network 109 can still act as a low pass filter to filter out some unnecessary frequency components.

In an embodiment, the scheduler device 102 generates the schedule based on the designated signal fidelity target, which is a frequency-based constraint, without utilizing time-based constraints such as a frame size limit and/or a periodic latency limit. For example, typical Ethernet networks may be scheduled according to various constraints, such as the topology, requested flow latency, frame sizes, and/or the like. But, the scheduler device 102 optionally may not utilize frame size or latency as constraints when generating the schedule 306 for the frequency-based communication of signals through the time-sensitive network 109. By not limiting the frame sizes and/or latency, the scheduler device 102 may be able to generate a schedule 306 in satisfaction of the designated signal fidelity target that would not have been possible if the frame size, periodic latency, and/or other constraints were applied. For example, the schedule 306 that is generated may have one or more frame sizes that would be outside of the permissible frame size limit if the frame size constraint was applied.

In an embodiment, the time-sensitive network 109 is configured to combine the various frequency components 212 of a given signal after the frequency components 212 are transmitted through the network 109. For example, a node 105 of the time-sensitive network 109 that is communicatively coupled to the designated listening device 106 may combine the frequency components 212 to form an intact (e.g., reconstructed) signal 202. The node 105 then transmits the intact signal 202 to the listening device 106 for the listening device 106 to process the signal. For example, combining the frequency components 212 to reconstruct the intact signal 202 may convert the frequency-based representation of the signal to a time-based representation of the signal 202. Optionally, a Fourier transform or the like may be applied to convert the signal 202. In an alternative embodiment, the listening device 106, not the node 105 communicatively coupled to the listening device 106, is configured to combine the frequency components 212 to reconstruct the signal 202.

In one or more embodiments, the scheduler device 102 may dynamically update the schedule 306 during the operation of the time-sensitive network 109. For example, after some signals are transmitted through the time-sensitive network 109, the scheduler device 102 may monitor the fidelity of the signals and other parameters. The scheduler device 102 may be configured to modify or update the schedule 306 based on the monitored parameters in order to improve the signal fidelity or the like. The scheduler device 102 modifies the schedule 306 by adjusting a width (e.g., size) of the frequency sub-band assigned to one or more of the slots 310, assigning additional frequency sub-bands to slots 310, assigning fewer frequency sub-bands to slots 310, altering the transmission intervals 314 of the slots 310, altering the order in which the frequency components 212 are transmitted, adjusting the traffic flow paths 120 through the network 109, and/or the like. For example, if the monitored signal fidelity drops below the designated signal fidelity target, the scheduler device 102 may increase the width (e.g., size) of at least one of the assigned frequency sub-bands which may reduce the portion of the signals that are filtered out, improving the signal fidelity.

The signals received by the listening devices 106 onboard the locomotive 150 (shown in FIG. 1) may be used to control the movement of the rail vehicle system. For example, the signal 202 (shown in FIG. 2) may represent a measurement of a component onboard the locomotive 150, such as the engine, traction motors 152, or an auxiliary load. Alternatively, the signal may be represent a command received from an operator using the input/output device 106A or a command received from another device located on another vehicle system or at a dispatch center. The signal 202 optionally may be classified as a time-critical message, or alternatively as a best effort message. Responsive to receiving the signal 202, the locomotive 150 may be controlled to slow or stop movement. For example, the brakes of the locomotive 150 may be automatically applied upon receipt of the signal 202 at the listening device.

Figure 4:
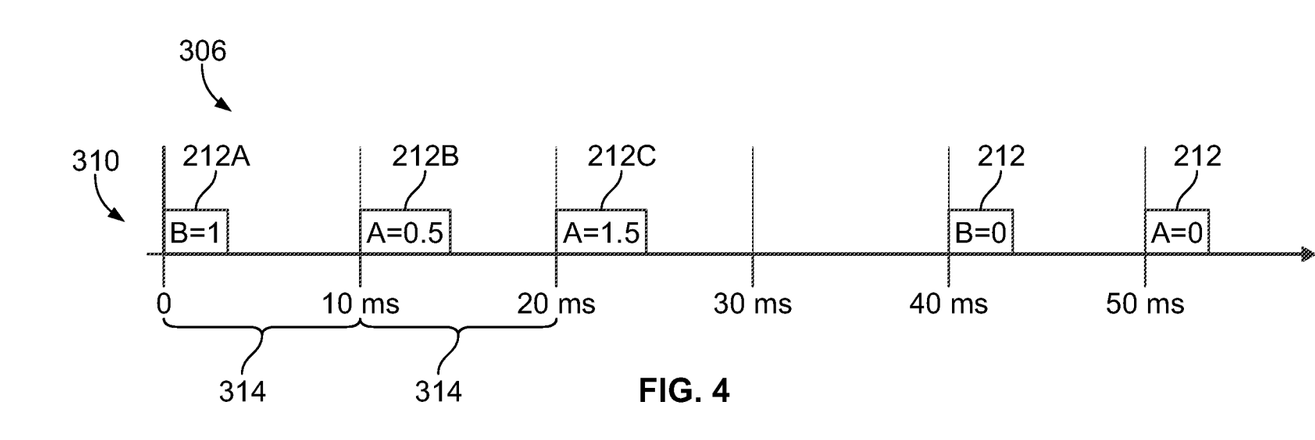
FIG. 4 depicts a portion of the schedule corresponding to a single slot over time according to an embodiment.

FIG. 4 depicts a portion of the schedule 306 corresponding to a single slot 310 over time according to an embodiment. In the illustrated embodiment, the slots 310 may be assigned to narrow frequency sub-bands and/or individual frequencies. In a non-limiting example, the illustrated slot 310 may be assigned to the frequency 100 Hz, or may be assigned to a narrow sub-band that includes 100 Hz, such as from 99 Hz to 101 Hz. In the illustrated embodiment, the frequency components 212 of an acoustic signal that is transmitted through the time-sensitive network 109 are assigned to various slots 310 based on the frequencies, but the frequency information is not transmitted with the frequency components 212. For example, the frequency components 212 shown in FIG. 4 contain information about the destination device and the amplitude.

Optionally, the frequency that is associated with the slot 310 may be selected based on a common or notable frequency within the acoustic signals that are conveyed through the network 109. For example, if a frequency component has a frequency of 99 Hz, then the slot 310 may be assigned to 99 Hz such that all frequency components 212 transmitted along the slot 310 have the 99 Hz frequency. Alternatively, if the slot 310 is associated with 100 Hz and an incoming frequency component of an input acoustic signal has a frequency that is 99 Hz, then the system may slightly degrade the quality of the signal by scheduling that frequency component for transmission within the 100 Hz slot. Such a frequency component will be interpreted by the listening device as having the modified frequency of 100 Hz, but the small discrepancy may be undetectable and therefore within a permissible error range.

In the illustrated embodiment, the acoustic signals are transmitted through the time-sensitive network 109 to a pair of receiving speakers that play (e.g., emit) the acoustic signals. The destination device for each frequency component 212 is one of the two speakers, either speaker A or speaker B. The frequency components 212 are scheduled to transmit at 10 ms transmission intervals 314 in FIG. 4, but different intervals may be used in other embodiments. The first frequency component 212A that is transmitted at time 0 in the slot 310 shows "B=1", which indicates that the destination device is speaker B, and the amplitude of the given frequency is 1. The second frequency component 212B that is transmitted at the second interval 314 starting at time 10 ms shows "A=0.5", which indicates that the destination device is speaker A, and the amplitude of the given frequency is 0.5.

Figure 5:
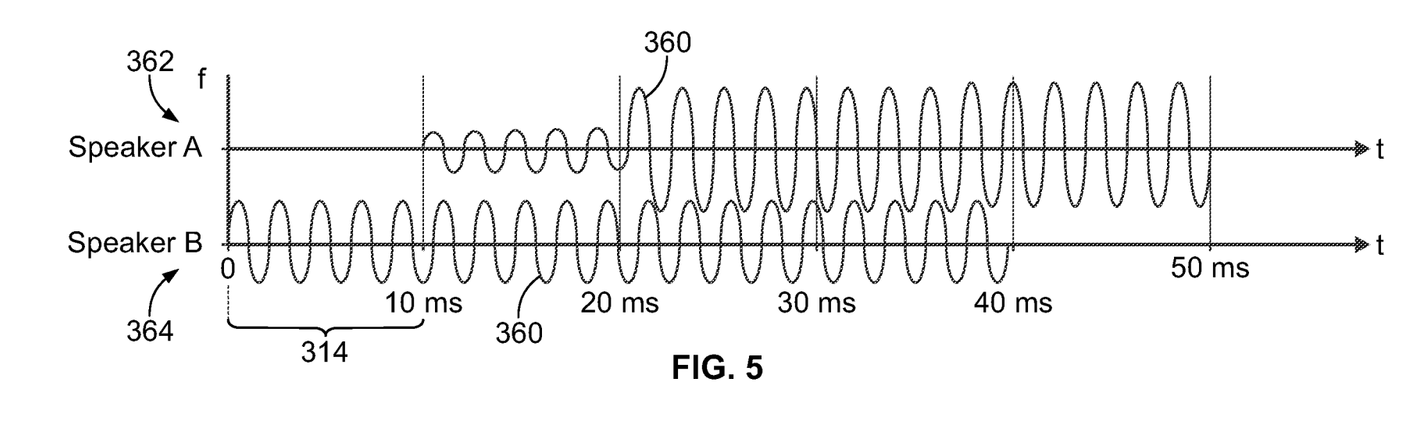
FIG. 5 shows sine waves produced by two speakers according to acoustic signals transmitted through the time-sensitive network as the frequency components shown in FIG. 4.

Additional reference is made to FIG. 5, which shows sine waves 360 produced by the speaker A 362 and by the speaker B 364 according to the acoustic signals transmitted through the time-sensitive network 109 as the frequency components 212 shown in FIG. 4. For example, upon receipt of the first frequency component 212A, speaker B is configured to implement the signal by emitting a tone having the frequency associated with the slot 310 shown in FIG. 4 and the amplitude of 1. If the associated frequency is 100 Hz, speaker B plays a tone with a 100 Hz frequency and a 1 amplitude. The amplitude values may be based on a reference amplitude or may have a unit such as decibels. Speaker A does not emit a tone during the first transmission interval 314 until time 10 ms because the first frequency component 212A was addressed only to speaker B. During the second transmission interval 314 that starts at time 10 ms, speaker A receives the second frequency component 212B and emits a tone having the designated frequency and the commanded amplitude of 0.5. Speaker B continues to play the tone having the amplitude of 1 until an additional command for speaker B is received. Therefore, during the second transmission interval, the sine waves 360 of speakers A and B have the same frequency, but the sine wave 360 of speaker B has a greater amplitude than the sine wave 360 of speaker A.

At 20 ms, the amplitude of the tone produced by speaker A increases to 1.5 due to the receipt of a third frequency component 212C shown in FIG. 4. No frequency component 212 is transmitted in the interval 314 starting at 30 ms, so the speakers A and B continue to emit the same respective tones during this interval 314 as the previous interval 314 starting at 20 ms. At 40 ms, the frequency component 212 indicates that speaker B has an amplitude of 0, which explicitly stops speaker B from producing a tone at the designated frequency. Speaker A is also explicitly stopped from producing the designated frequency at time 50 ms. Therefore, after time 50 ms, neither speaker generates a tone having the designated frequency associated with the slot 310.

FIGS. 4 and 5 illustrate a single slot 310, but it is understood that the schedule 306 for the time-sensitive network 109 may schedule the transmission of frequency components 212 of acoustic signals as shown in FIGS. 4 and 5 for each of the slots 310 of the frequency band 308 (shown in FIG. 3) to convey acoustic signals along different frequencies. For example, if the slot 310 shown in FIG. 4 is associated with the frequency 100 Hz, then additional slots 310 associated with other frequencies such as 50 Hz, 25 Hz, 12.5 Hz, and/or the like may be similarly scheduled to enable the speakers A and B to produce sounds (e.g., music) having multiple frequencies. The audio speaker device (e.g., receiver) that receives the acoustic signals from the network 109 may be buffer-less because the speakers can simply play the amplitudes of the designated frequencies as the frequency components are received at the speaker device.

Figure 6:
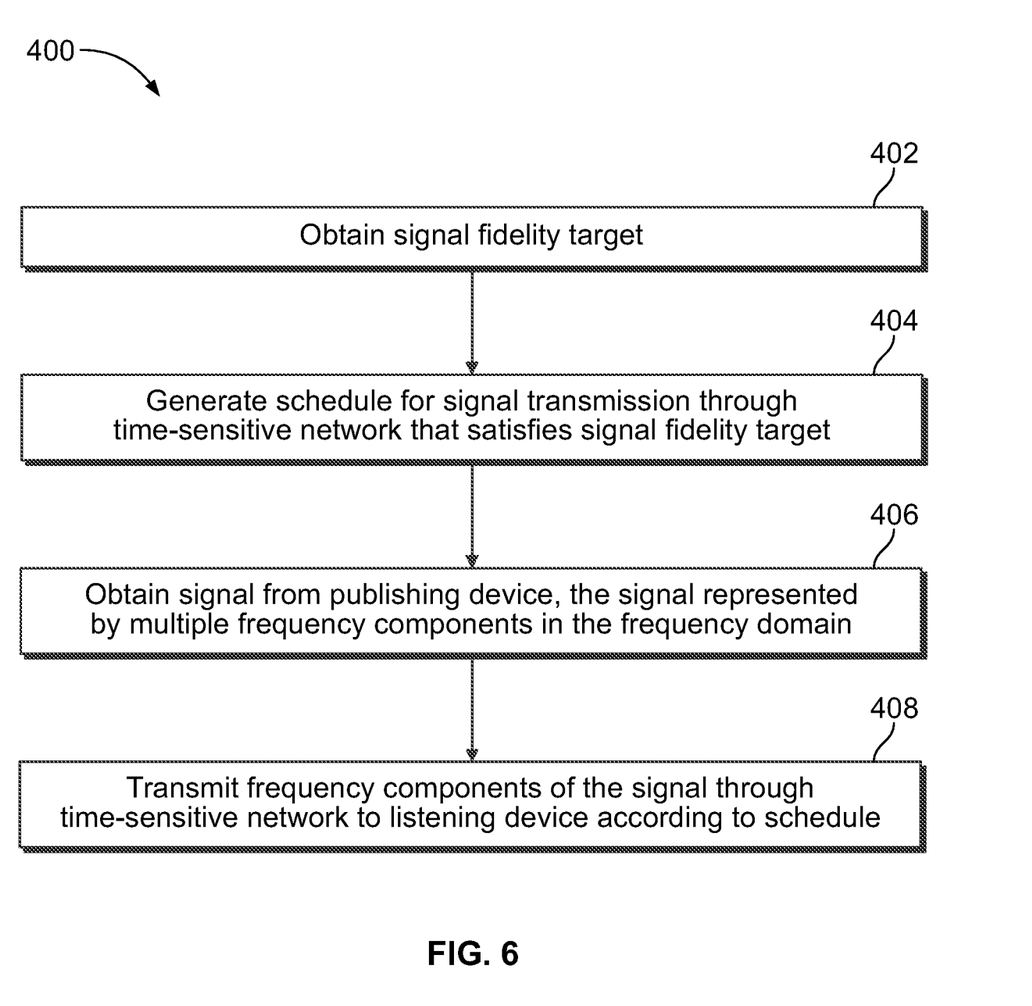
FIG. 6 illustrates a flowchart of one embodiment of a method for communicating messages in a time-sensitive network.

FIG. 6 illustrates a flowchart of one embodiment of a method 400 for communicating messages in a time-sensitive network onboard a vehicle system. The method 400 can represent operations performed by the control system 107 (e.g., by the scheduler device 102) of the communication system 100. Referring to FIGS. 1 through 5, at 402, a signal fidelity target is obtained. The signal fidelity target may be received by an operator selection or accessed in a memory. The signal fidelity target may represent a degree of correspondence between a state of a signal exiting a time-sensitive network 109 at a listening device 106 and a state of the same signal entering the time-sensitive network 109 at a publishing device 106.

At 404, a schedule 306 is generated for transmission of signals within the time-sensitive network 109 onboard one or more locomotives 150. The schedule 306 defines multiple slots 310 assigned to different discrete frequency sub-bands within a frequency band 308. The slots 310 have designated transmission intervals 314. The schedule 306 may be generated in the frequency domain. For example, signals are transmitted through the network 109 based on frequency components 212 of the signals. The schedule 306 is generated to satisfy the signal fidelity target. For example, the slots 310 may be assigned to a sufficient number of frequency sub-bands to satisfy the signal fidelity target. Optionally, the schedule 306 may be generated without utilizing one or more time-based parameters, such as frame size and/or periodic latency, as constraints. The schedule 306 may be generated such that the time-sensitive network 109 functions as a low pass filter. For example, the frequency sub-bands assigned to the slots 310 may represent less than an entirety of the frequency band 308, and the time-sensitive network 109 may not transmit frequency components 212 of signals that have frequencies outside of the assigned sub-bands.

At 406, a signal 202 is obtained from a publishing device 106. The signal 202 is represented in the frequency domain by multiple frequency components 212. The signal 202 may be one or more of an audio signal, an ultrasound signal, a vibration signal, an audible sound signal, an infrasound signal, or the like. The signal 202 may represent a measurement of a component onboard the locomotive 150. The frequency components 212 of the signal 202 may be encoded within Ethernet frames.

At 408, the frequency components 212 of the signal 202 are transmitted through the time-sensitive network 109 to a listening device 106 according to the schedule 306. The time-sensitive network 109 includes various nodes 105 and communication links 103 between the nodes 105. At least some of the frequency components 212 of the signal 202 are transmitted within different slots 310 of the schedule 306 based on the frequency sub-bands assigned to the slots 310. For example, a first frequency component 212 of the signal 202 may be transmitted within a first slot 310A of the schedule 306 assigned to a frequency sub-band that contains a frequency of the first frequency component 212. A second frequency component 212 of the signal 202 may be transmitted within a second slot 310B of the schedule 306 assigned to a different frequency sub-band that contains a frequency of the second frequency component 212. After transmission through the network 109, the different frequency components 212 may be combined to form an intact signal 202 that is provided to the listening device 106. The combination may include converting the signal 202 from a frequency-based representation to a time-based representation. The signal 202 received at the listening device 106 may be used for controlling operations (e.g., movement) of the vehicle system.

In one or more embodiments, a vehicle-based communication system is provided that transports frequency sub-band encoded signals through a time-sensitive network. The signals have a frequency content that may include one or more of audio compressed signals, ultrasounds, vibrations, acoustic phenomena (e.g., acousto-optics), and/or the like. The use of time-aware scheduler devices on a time-sensitive network may allow for reducing or omitting various signal compression and/or conversion steps, such as packing and unpacking compressed signals.

In a non-limiting example, a scheduler device can divide a time-sensitive network into a designated number of slots (e.g., 32 slots) that are each assigned to a specific frequency sub-band. A slot may be sent at a designated transmission interval, such as once every 156 microseconds. The size of the slots can be adjusted to reflect the number of streams to be sent over the network. The size of the slots may be calibrated. In a non-limiting example, 32 slots may be designated that each have a size of 2000 octets. For a 1 Gbps port, the corresponding frequency band occupies 16 microseconds. The total bandwidth consumed by the 32 slots is 512 microsecond. Assuming 5 milliseconds as the maximal temporal resolution of a human ear, then it corresponds to 10.24% of the available bandwidth.

The slot-specific size can be adjusted. For example, in audio compression, frequencies close to 20 kHz are hardly detected by the human ear, and as such it can be expected that the frequency content is often reduced. In this case, the slot size for frequencies close to 4 kHz may be 2000 octets, while the slot size for frequencies close to 20 kHz may be 256 octets, as defined by the user. This example can be generalized to any application utilizing a time-sensitive network to transport frequency content that can be subdivided into sub-bands.

The time-aware scheduler device can be configured in such a way that it drops a sample if it must be enqueued. For example, if a talker (e.g., publishing device) is sending samples too fast for a specific sub-band, then compression is performed by the network itself, or, the network can be considered as a low-pass filter. Generally, the bridge dropping a sample detects the corresponding miss and can advertise to all the talkers that lossy compression is being performed on a specific band.

The Ethernet frames may be at least 48 octets long (excluding the Ethernet header). The stream ID can be used to represent the sample or a sequence, and may use up to 8 octets. Out of the remaining 40 octets, the peaks of 5 frequencies can be represented in a given sub-band, with 4 octets representing the frequency in its sub-band and 4 octets for its amplitude. If quantization error is not damaging the quality too much, potentially 10 frequencies can be used. Different streams may be packed into the same frame. In this case, the identifier can be used to make the distinction.

The media clock may not be necessary if the listening device has a time-aware scheduler. The listening device keeps track of the number of slots and multiplies it by the period (which equals to 5 milliseconds in our example) and then adds 156 microseconds per band id (for instance, 1.56 milliseconds for the $10^{th}$ sub-band) to reconstruct the media clock. The audio signals may be subject to dispersion because each of the sub-bands is slightly delayed from each other, in our example by 156 microseconds. Because the 156 microseconds is below the 5 millisecond maximal temporal resolution of a human ear, the dispersion is not noticeable.

Time-sensitive network generalized sub-band coding may be specified utilizing a quantification of signal error. In some use-cases, a goal is to transmit a signal in the frequency domain. In other use-cases, a goal is to transmit a signal coded in the frequency domain, but then to convert to the time domain upon reception. In at least one embodiment, the scheduler device of the time-sensitive network is configured to generate a schedule based on a quality-of-service (QoS) requirement or constraint for sub-band coding. For example, the QoS requirement may be an objective function, and the scheduler device may compute an IEEE 802.1Qbv configuration that meets the required QoS requirement. The QoS requirement may represent or may be related to the signal fidelity target described herein.

A goal of one or more embodiments herein is to find a generalized means of decoupling the implementation (the specific Qbv configuration) from the QoS measurement. This is beneficial because there may be multiple Qbv configurations that yield the same QoS measurement. Forcing the time-sensitive network to use a specific Qbv configuration, that is, specific frame size and maximum latency requirements, limits the solution space of the scheduler device when more and better solutions are available to meet a required QoS. According to at least one embodiment, the scheduler device is configured to generate the schedule to meet the general QoS requirement, and is not over-constrained by having to find a pre-ordained Qbv configuration. The scheduler device may be allowed to pick from any of a variety of satisfactory solutions that meet the QoS requirement. Qbv specifies data samples of a given maximum size into periodic sampling rates over a time-sensitive network. These may be samples from the time domain or from the frequency domain, such as specific frequency components. The QoS is the input to the scheduler device. The scheduler device may be free to choose any solution that satisfies the higher-level QoS requirements, and optionally is not given the maximum Ethernet frame size or maximum latencies as constraints. This decoupling may allow for a larger solution space and a better solution. In an alternative, hybrid approach, all three of the QoS requirement, maximum frame sizes, and maximum latencies are utilized as constraints when scheduling the time-sensitive network.

With regards to the selection of which QoS measurement or requirement to use as the objective function, the QoS measurement generally must be able to map from a set of Ethernet frame sizes and periodic latencies (IEEE 802.1Qbv configuration) into a received signal quality. One option is to use the power spectral density (PSD), which describes the distribution of the average power of a signal over its frequency components. The PSD might be useful in specifying the QoS in the frequency domain or estimating how well the time domain was reconstructed after transmission. Another option is to use mean opinion scores, which have been used for human sensual input, both audio and visual. A third option is to use peak signal-to-noise ratio (PSNR), which can be automated to estimate video quality.

In an embodiment, a vehicle communication system includes multiple nodes of a time-sensitive network disposed onboard plural vehicles, and a scheduler device. The nodes are communicatively connected to each other via wired and/or wireless links. At least one of the nodes is configured to obtain a first signal from a publishing device. The first signal is represented in a frequency domain by multiple frequency components. The scheduler device (e.g., comprising one or more processors) is configured to generate a schedule for transmission of signals including the first signal within the time-sensitive network. The schedule defines multiple slots assigned to different discrete frequency sub-bands within a frequency band. The slots have designated transmission intervals. The nodes are configured to transmit the first signal through the time-sensitive network to a listening device such that the first signal is received at the listening device within a designated time window according to the schedule. At least some of the frequency components of the first signal are transmitted through the time-sensitive network within different slots of the schedule based on the frequency sub-bands assigned to the slots. In one aspect, the plural vehicles are mechanically connected to one another, e.g., the vehicles may be rail vehicles in a train. In another embodiment, the vehicles are not mechanically connected to one another, but are configured to wirelessly communicate signals over the network for coordinated control for movement together along a route.

In one embodiment, a communication system includes a scheduler device including one or more processors configured to generate a schedule for communication of signals through nodes of a time-sensitive network that are communicatively connected to each other via links of the time-sensitive network. At least a first signal of the signals is represented in a frequency domain by multiple frequency components and received into the time-sensitive network from a publishing device. The one or more processors are configured to generate the schedule by assigning multiple slots having designated transmission intervals to different discrete frequency sub-bands within a frequency band. The schedule is generated to direct the nodes to communicate the first signal from the publishing device through the time-sensitive network to a listening device such that the first signal is received at the listening device within a designated time window according to the schedule. At least some of the frequency components of the first signal are transmitted through the time-sensitive network based on the frequency sub-bands assigned to the slots.

Optionally, the one or more processors are configured to generate the schedule to direct the nodes to transmit a first frequency component of the first signal within a first slot of the slots that is assigned to a frequency sub-band that contains a frequency of the first frequency component, and to transmit a second frequency component of the first signal within a second slot of the slots that is assigned to a different frequency sub-band that contains a frequency of the second frequency component.

Optionally, the one or more processors are configured to determine a designated signal fidelity target that represents a degree of correspondence between an exit state of the first signal exiting the time-sensitive network at the listening device and an entry state of the first signal entering the time-sensitive network at the publishing device. The one or more processors can be configured to generate the schedule to assign the slots to at least a number of the frequency sub-bands associated with the designated signal fidelity target.

Optionally, the one or more processors are configured to generate the schedule based on the designated signal fidelity target without utilizing a frame size limit or a periodic latency limit as a constraint to the schedule.

Optionally, the one or more processors are configured to generate the schedule to assign less than all the frequency sub-bands of the frequency band to the slots. The nodes can be configured to filter out one or more of the frequency components of the first signal having a frequency outside of the frequency sub-bands by transmitting only the frequency components of the first signal having frequencies within the frequency sub-bands assigned to the slots.

Optionally, the one or more processors are configured to generate the schedule to stagger the transmission intervals of the slots such that a first frequency component of the first signal within a first slot is transmitted by the nodes of the time-sensitive network according to the schedule at different times than the nodes transmit a second frequency component of the first signal within a second slot.

Optionally, the frequency components of the first signal are encoded within Ethernet frames. The Ethernet frames can include data representing one or more of a frequency, an amplitude, or a phase of each of the frequency components encoded therein.

Optionally, the first signal is one or more of an audio signal, an ultrasound signal, a vibration signal, an audible sound signal, and/or an infrasound signal.

Optionally, the one or more processors are configured to generate or modify the schedule by changing a size of the frequency sub-band assigned to one or more of the slots after the first signal is transmitted through the time-sensitive network.

In one embodiment, a method includes generating a schedule for transmission of signals within a time-sensitive network. The schedule defines multiple slots assigned to different discrete frequency sub-bands within a frequency band and the slots have designated transmission intervals. The method also includes obtaining a first signal of the signals from a publishing device. The first signal is represented in a frequency domain by multiple frequency components. The method also includes transmitting the first signal through the time-sensitive network to a listening device such that the first signal is received at the listening device within a designated time window according to the schedule. At least some of the frequency components of the first signal are transmitted through the time-sensitive network within different slots of the schedule based on the frequency sub-bands assigned to the slots.

Optionally, transmitting the first signal through the time-sensitive network includes transmitting a first frequency component of the first signal within a first slot of the schedule assigned to a frequency sub-band that contains a frequency of the first frequency component, and transmitting a second frequency component of the first signal within a second slot of the schedule assigned to a different frequency sub-band that contains a frequency of the second frequency component.

Optionally, the method also includes obtaining a designated signal fidelity target that represents correspondence between an exit state of the first signal exiting the time-sensitive network at the listening device and an entry state of the first signal entering the time-sensitive network at the publishing device. Generating the schedule may include assigning the slots to a sufficient number of the frequency sub-bands to satisfy the designated signal fidelity target.

Optionally, the schedule is generated based on the designated signal fidelity target without utilizing a frame size limit or a periodic latency limit as a constraint on the schedule.

Optionally, the frequency sub-bands assigned to the slots defined by the schedule represent less than an entirety of the frequency band. Transmitting the first signal can include transmitting only the frequency components of the first signal having frequencies within the frequency sub-bands assigned to the slots to filter out one or more of the frequency components of the first signal having a frequency outside of the frequency sub-bands.

Optionally, generating the schedule comprises staggering the transmission intervals of the slots such that a first frequency component of the first signal within a first slot is transmitted by the nodes of the time-sensitive network according to the schedule at different times than the nodes transmit a second frequency component of the first signal within a second slot.

Optionally, the frequency components of the first signal are encoded within Ethernet frames, and the Ethernet frames can include data representing one or more of a frequency, an amplitude, and/or a phase of each of the frequency components encoded therein.

Optionally, the first signal is one or more of an audio signal, an ultrasound signal, a vibration signal, an audible sound signal, and/or an infrasound signal.

Optionally, the method also includes combining the frequency components of the first signal after transmitting the frequency components through the time-sensitive network to provide an intact first signal to the listening device.

In one embodiment, a communication system includes a scheduler device including one or more processors configured to generate a schedule for communication of signals through nodes of a time-sensitive network that are communicatively connected to each other via links of the time-sensitive network. At least a first signal of the signals is represented in a frequency domain by multiple frequency components and received into the time-sensitive network from a publishing device. The one or more processors are configured to generate the schedule by assigning multiple slots having designated transmission intervals to different discrete frequency sub-bands within a frequency band. The schedule is generated to direct the nodes to communicate the frequency components of the first signal through the time-sensitive network based on the frequency sub-bands assigned to the slots such that the nodes transmit a first frequency component of the first signal within a first slot of the slots that is assigned to a frequency sub-band that contains a frequency of the first frequency component and the nodes transmit a second frequency component of the first signal within a second slot of the slots that is assigned to a different frequency sub-band that contains a frequency of the second frequency component.

Optionally, the one or more processors are configured to generate or modify the schedule by changing a size of the frequency sub-band assigned to one or more of the slots after the first signal is transmitted through the time-sensitive network.

In an embodiment, a rail vehicle communication system is provided that includes multiple nodes of a time-sensitive network and a scheduler device. The time-sensitive network is disposed onboard one or more locomotives. The nodes are communicatively connected to each other via links. At least one of the nodes is configured to obtain a first signal from a publishing device. The first signal is represented in a frequency domain by multiple frequency components. The scheduler device comprises one or more processors and is configured to generate a schedule for transmission of signals including the first signal within the time-sensitive network. The schedule defines multiple slots assigned to different discrete frequency sub-bands within a frequency band. The slots have designated transmission intervals. The nodes are configured to transmit the first signal through the time-sensitive network to a listening device such that the first signal is received at the listening device within a designated time window according to the schedule. At least some of the frequency components of the first signal are transmitted through the time-sensitive network within different slots of the schedule based on the frequency sub-bands assigned to the slots.

Optionally, the nodes are configured to transmit a first frequency component of the first signal within a first slot of the schedule assigned to a frequency sub-band that contains a frequency of the first frequency component, and the nodes transmit a second frequency component of the first signal within a second slot of the schedule assigned to a different frequency sub-band that contains a frequency of the second frequency component.

Optionally, the scheduler device is configured to obtain a designated signal fidelity target that represents a degree of correspondence between a state of the first signal exiting the time-sensitive network at the listening device and a state of the first signal entering the time-sensitive network at the publishing device. The scheduler device generates the schedule to assign the slots to a sufficient number of the frequency sub-bands to satisfy the designated signal fidelity target. Optionally, the scheduler device is configured to generate the schedule based on the designated signal fidelity target without utilizing a frame size limit or a periodic latency limit as a constraint.

Optionally, the frequency sub-bands assigned to the slots defined by the schedule represent less than an entirety of the frequency band. The nodes are configured to transmit only the frequency components of the first signal having frequencies within the frequency sub-bands assigned to the slots to filter out one or more of the frequency components of the first signal having a frequency outside of the frequency sub-bands.

Optionally, the scheduler device is configured to generate the schedule to stagger the transmission intervals of the slots such that a first frequency component of the first signal within a first slot is transmitted by nodes of the time-sensitive network according to the schedule at different times than the nodes transmit a second frequency component of the first signal within a second slot.

Optionally, the frequency components of the first signal are encoded within Ethernet frames, and the Ethernet frames include data representing a frequency, an amplitude, and/or a phase of each of the frequency components encoded therein.

Optionally, the first signal is an audio signal, an ultrasound signal, a vibration signal, an audible sound signal, and/or an infrasound signal.

Optionally, the first signal represents a measurement of a component onboard a first locomotive of the one or more locomotives.

Optionally, the scheduler device is further configured to modify a size of the frequency sub-band assigned to one or more of the slots after the first signal is transmitted through the time-sensitive network.

In an embodiment, a method for locomotive communications is provided that includes generating a schedule for transmission of signals within a time-sensitive network onboard one or more locomotives. The schedule defines multiple slots assigned to different discrete frequency sub-bands within a frequency band. The slots have designated transmission intervals. The method includes obtaining a first signal of the signals from a publishing device. The first signal is represented in a frequency domain by multiple frequency components. The method also includes transmitting the first signal through the time-sensitive network to a listening device such that the first signal is received at the listening device within a designated time window according to the schedule. At least some of the frequency components of the first signal are transmitted through the time-sensitive network within different slots of the schedule based on the frequency sub-bands assigned to the slots.

Optionally, transmitting the first signal through the time-sensitive network includes transmitting a first frequency component of the first signal within a first slot of the schedule assigned to a frequency sub-band that contains a frequency of the first frequency component, and transmitting a second frequency component of the first signal within a second slot of the schedule assigned to a different frequency sub-band that contains a frequency of the second frequency component.

Optionally, the method also includes obtaining a designated signal fidelity target that represents a degree of correspondence between a state of the first signal exiting the time-sensitive network at the listening device and a state of the first signal entering the time-sensitive network at the publishing device. Generating the schedule comprises assigning the slots to a sufficient number of the frequency sub-bands to satisfy the designated signal fidelity target. Optionally, the schedule is generated based on the designated signal fidelity target without utilizing a frame size limit or a periodic latency limit as a constraint.

Optionally, the frequency sub-bands assigned to the slots defined by the schedule represent less than an entirety of the frequency band. Transmitting the first signal comprises transmitting only the frequency components of the first signal having frequencies within the frequency sub-bands assigned to the slots to filter out one or more of the frequency components of the first signal having a frequency outside of the frequency sub-bands.

Optionally, generating the schedule comprises staggering the transmission intervals of the slots such that a first frequency component of the first signal within a first slot is transmitted by nodes of the time-sensitive network according to the schedule at different times than the nodes transmit a second frequency component of the first signal within a second slot.

Optionally, the frequency components of the first signal are encoded within Ethernet frames, and the Ethernet frames includes data representing a frequency, an amplitude, and/or a phase of each of the frequency components encoded therein.

Optionally, the first signal is an audio signal, an ultrasound signal, a vibration signal, an audible sound signal, and/or an infrasound signal.

Optionally, the method also includes combining the frequency components of the first signal after transmitting the frequency components through the time-sensitive network to provide an intact first signal to the listening device.

Optionally, the first signal represents a measurement of a component onboard a first locomotive of the one or more locomotives.

Optionally, the method also includes modifying a size of the frequency sub-band assigned to one or more of the slots after transmitting the first signal through the time-sensitive network.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising," "including," and "having" an element or a plurality of elements with a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are example embodiments. Many other embodiments will be apparent to those of ordinary skill in the art upon reviewing the above description. The scope of the subject matter described herein should, therefore, be determined with reference to the appended claims, along with the full scope of equivalents to which such claims are entitled. In the appended claims, the terms "including" is used as the plain-English equivalents of the term "comprising." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A communication system comprising:
   a scheduler device including one or more processors configured to generate a schedule for communication of signals through nodes of a time-sensitive network that are communicatively connected to each other via links of the time-sensitive network, at least a first signal of the signals represented in a frequency domain by multiple frequency components and received into the time-sensitive network from a publishing device,
   wherein the one or more processors are configured to generate or modify the schedule by: 1. assigning multiple slots having designated transmission intervals to different discrete frequency sub-bands within a frequency band, wherein each sub-band represents a range of frequencies in the frequency band, and 2. changing a size of the frequency sub-band assigned to one or more of the slots after the first signal is transmitted through the time-sensitive network, and
   wherein the schedule is generated to direct the nodes to communicate the first signal from the publishing device through the time-sensitive network to a listening device such that the first signal is received at the listening device within a designated time window according to the schedule, and wherein at least some of the frequency components of the first signal are transmitted through the time-sensitive network based on the frequency sub-bands assigned to the slots.

2. The communication system of claim 1, wherein the one or more processors are configured to generate the schedule to direct the nodes to transmit a first frequency component of the first signal within a first slot of the slots that is assigned to a frequency sub-band that contains a frequency of the first frequency component, and to transmit a second frequency component of the first signal within a second slot of the slots that is assigned to a different frequency sub-band that contains a frequency of the second frequency component.

3. The communication system of claim 1, wherein the one or more processors are configured to determine a designated signal fidelity target that represents a degree of correspondence between an exit state of the first signal exiting the time-sensitive network at the listening device and an entry state of the first signal entering the time-sensitive network at the publishing device,
wherein the one or more processors are configured to generate the schedule to assign the slots to at least a number of the frequency sub-bands associated with the designated signal fidelity target.

4. The communication system of claim 3, wherein the one or more processors are configured to generate the schedule based on the designated signal fidelity target without utilizing a frame size limit or a periodic latency limit as a constraint to the schedule.

5. The communication system of claim 1, wherein the one or more processors are configured to generate the schedule to assign less than all the frequency sub-bands of the frequency band to the slots,
wherein the nodes are configured to filter out one or more of the frequency components of the first signal having a frequency outside of the frequency sub-bands by transmitting only the frequency components of the first signal having frequencies within the frequency sub-bands assigned to the slots.

6. The communication system of claim 1, wherein the one or more processors are configured to generate the schedule to stagger the transmission intervals of the slots such that a first frequency component of the first signal within a first slot is transmitted by the nodes of the time-sensitive network according to the schedule at different times than the nodes transmit a second frequency component of the first signal within a second slot.

7. The communication system of claim 1, wherein the frequency components of the first signal are encoded within Ethernet frames, the Ethernet frames including data representing one or more of a frequency, an amplitude, or a phase of each of the frequency components encoded therein.

8. The communication system of claim 1, wherein the first signal is one or more of an audio signal, an ultrasound signal, a vibration signal, an audible sound signal, or an infrasound signal.

9. A method comprising:
generating or modifying a schedule for transmission of signals within a time-sensitive network, wherein the schedule defines multiple slots assigned to different discrete frequency sub-bands within a frequency band, the slots having designated transmission intervals, wherein each sub-band represents a range of frequencies in the frequency band;
obtaining a first signal of the signals from a publishing device, the first signal represented in a frequency domain by multiple frequency components; and
transmitting the first signal through the time-sensitive network to a listening device such that the first signal is received at the listening device within a designated time window according to the schedule,
wherein at least some of the frequency components of the first signal are transmitted through the time-sensitive network within different slots of the schedule based on the frequency sub-bands assigned to the slots; and
wherein generating or modifying the schedule further comprises: changing a size of the frequency sub-band assigned at least one of the multiple slots after the first signal is transmitted through the time-sensitive network.

10. The method of claim 9, wherein transmitting the first signal through the time-sensitive network includes transmitting a first frequency component of the first signal within a first slot of the schedule assigned to a frequency sub-band that contains a frequency of the first frequency component, and transmitting a second frequency component of the first signal within a second slot of the schedule assigned to a different frequency sub-band that contains a frequency of the second frequency component.

11. The method of claim 9, further comprising:
obtaining a designated signal fidelity target that represents correspondence between an exit state of the first signal exiting the time-sensitive network at the listening device and an entry state of the first signal entering the time-sensitive network at the publishing device,
wherein generating the schedule comprises assigning the slots to a sufficient number of the frequency sub-bands to satisfy the designated signal fidelity target.

12. The method of claim 11, wherein the schedule is generated based on the designated signal fidelity target without utilizing a frame size limit or a periodic latency limit as a constraint on the schedule.

13. The method of claim 9, wherein the frequency sub-bands assigned to the slots defined by the schedule represent less than an entirety of the frequency band,
wherein transmitting the first signal comprises transmitting only the frequency components of the first signal having frequencies within the frequency sub-bands assigned to the slots to filter out one or more of the frequency components of the first signal having a frequency outside of the frequency sub-bands.

14. The method of claim 9, wherein generating the schedule comprises staggering the transmission intervals of the slots such that a first frequency component of the first signal within a first slot is transmitted by the nodes of the time-sensitive network according to the schedule at different times than the nodes transmit a second frequency component of the first signal within a second slot.

15. The method of claim 9, wherein the frequency components of the first signal are encoded within Ethernet frames, the Ethernet frames including data representing one or more of a frequency, an amplitude, or a phase of each of the frequency components encoded therein.

16. The method of claim 9, wherein the first signal is one or more of an audio signal, an ultrasound signal, a vibration signal, an audible sound signal, or an infrasound signal.

17. The method of claim 9, further comprising:
combining the frequency components of the first signal after transmitting the frequency components through the time-sensitive network to provide an intact first signal to the listening device.

18. A communication system comprising:
a scheduler device including one or more processors configured to generate a schedule for communication of signals through nodes of a time-sensitive network that are communicatively connected to each other via links of the time-sensitive network, at least a first signal of the signals represented in a frequency domain by multiple frequency components and received into the time-sensitive network from a publishing device,
wherein the one or more processors are configured to generate or modify the schedule by: 1. assigning multiple slots having designated transmission intervals to different discrete frequency sub-bands within a frequency band, wherein each sub-band represents a range of frequencies in the frequency band, and 2. changing a size of the frequency sub-band assigned to one or more of the slots after the first signal is transmitted through the time-sensitive network, and
wherein the schedule is generated to direct the nodes to communicate the frequency components of the first signal through the time-sensitive network based on the frequency sub-bands assigned to the slots such that the nodes transmit a first frequency component of the first signal within a first slot of the slots that is assigned to a frequency sub-band that contains a frequency of the first frequency component and the nodes transmit a second frequency component of the first signal within a second slot of the slots that is assigned to a different frequency sub-band that contains a frequency of the second frequency component.

* * * * *